United States Patent Office 3,551,373
Patented Dec. 29, 1970

3,551,373
ACRYLONITRILE COPOLYMERS
Jeno Szita, Cologne, Worringen, and Horst Wieden, Heinrich Rinkler, Alfred Nogaj, Herbert Marzolph, and Gunther Nischk, Dormagen, Germany, assignors to Farbenfabriken Bayer Aktiengesellschaft, Leverkusen, Germany, a corporation of Germany
No Drawing. Filed Jan. 26, 1968, Ser. No. 700,693
Claims priority, application Germany, Feb. 3, 1967, F 51,430
Int. Cl. C07d 87/46; C08f 15/02
U.S. Cl. 260—79.3   5 Claims

ABSTRACT OF THE DISCLOSURE

The invention relates to fibre-forming acrylonitrile copolymers showing a high affinity for acid dyes, and to a process for their production by copolymerising acrylonitrile with an unsaturated carboxylic acid hydrazide of the general formula

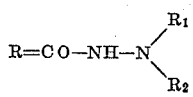

or with a quaternised derivative thereof, wherein $R_1$ and $R_2$ represent alkyl radicals or together with the nitrogen atom form a heterocyclic ring and R represents a radical of the formulae

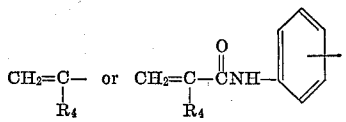

$R_4$ being hydrogen or methyl.

---

This invention relates to fibre-forming acrylonitrile copolymers showing a high affinity for acid dyes, coupled with advantageous properties, and to a process for their production by copolymerising acrylonitrile with an unsaturated carboxylic acid hydrazide or a quaternised derivative thereof.

It is known that the affinity of acrylonitrile polymers for acid dyes can be improved by copolymerising comonomers containing basic groups, such as unsaturated tertiary or quaternary amines, preferably vinyl pyridines and alkyl-substituted derivatives thereof. Copolymerisation is generally carried out in suspension in aqueous medium. Unfortunately, it has not yet been possible in this way to provide satisfactory products because the basic groups incorporated detrimentally affect the thermal stability of polyacrylonitrile to a considerable extent. Fibres and filaments produced from such copolymers do not have the high degree of whiteness required and discolour very appreciably at elevated temperature. Although it is possible to improve thermal stability by mixing together two polymers, only one of which contains the basic groups in correspondingly higher quantities, this involves additional process steps which are not only expensive but also difficult to control from the technological point of view. Although acrylonitrile/methyl vinyl pyridine copolymers with a high affinity for dyes can also be obtained by copolymerisation in dimethyl formamide solution, the textile properties and thermal stability of the spun filaments are inadequate in this case also. In this instance also, the tendency of the end products to discolour could only be eliminated by mixing together two different polymers which had to be purified beforehand by solution and reprecipitation.

In addition, it is known that unsaturated semicarbazides and quaternary salts thereof can also be copolymerised with acrylonitrile, giving thermally stable polymers with a high affinity for both acid and basic dyes. These comonomers could only be copolymerised in aqueous medium and not in the conventional organic solvents for polyacrylonitrile, such as dimethyl formamide. When polymerisation was carried out in solution in dimethyl formamide, the progress of the reaction was inhibited by the comonomer, resulting in the formation of discoloured solutions. When applying heat to the solutions (for instance, removal of any unreacted monomer residues by thinlayer or falling film evaporation, or dry spinning) this was accompanied by a sharp decrease in viscosity, due to degradation of the polymers formed, with the result that the solution could not satisfactorily be dry spun. Difficulties were also experienced in the dry spinning of extremely thin filaments (less than 3 den.) from the semicarbazide copolymers obtained by aqueous polymerisation. The filaments were of defective tensile strength and could not be stretched.

It is an object of this invention to provide fibre-forming acrylonitrile copolymers containing at least 80% by weight of copolymerised acrylonitrile and 0.5 to 20% by weight of a copolymerised N,N-disubstituted carboxylic acid hydrazide of the formula

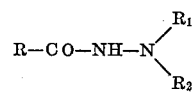

or its quaternised derivative of the formula

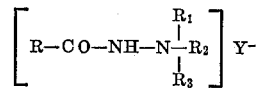

wherein $R_1$ and $R_2$ each represents an alkyl radical or $R_1$ and $R_2$ together with the nitrogen atom to which they are attached, form a heterocyclic ring, R represents a radical of the formulae

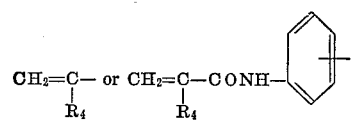

wherein $R_4$ represents hydrogen or a methyl radical, $R_3$ represents a $C_1$ to $C_5$-alkyl radical and $Y^-$ represents an anion selected from the group consisting of a sulfate and a sulfonate, the balance being 2 to 12% by weight of one or more additional comonomers.

The acrylonitrile copolymers according to the invention show extremely high thermal stability, a high affinity for basic dyes and are readily spinnable.

It is another object of this invention, to provide a process for the production of acrylonitrile copolymers which comprises copolymerising at least 80% by weight of acrylonitrile together with an olefinically unsaturated N,N-disubstituted carboxylic acid hydrazide or a quaternisation product thereof, the balance being 2 to 12% by weight of one or more additional comonomers, the percentages by weight being based on the total of monomers being used.

Effectively copolymerisable N,N-disubstituted carboxylic acid hydrazide comonomers corresponding to the general formulae

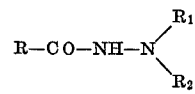

and

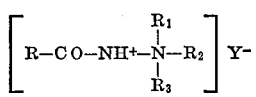

wherein R, R₁, R₂, and R₃ and Y⁻ have the meaning as given above, which are used as comonomers according to the invention, are for example:

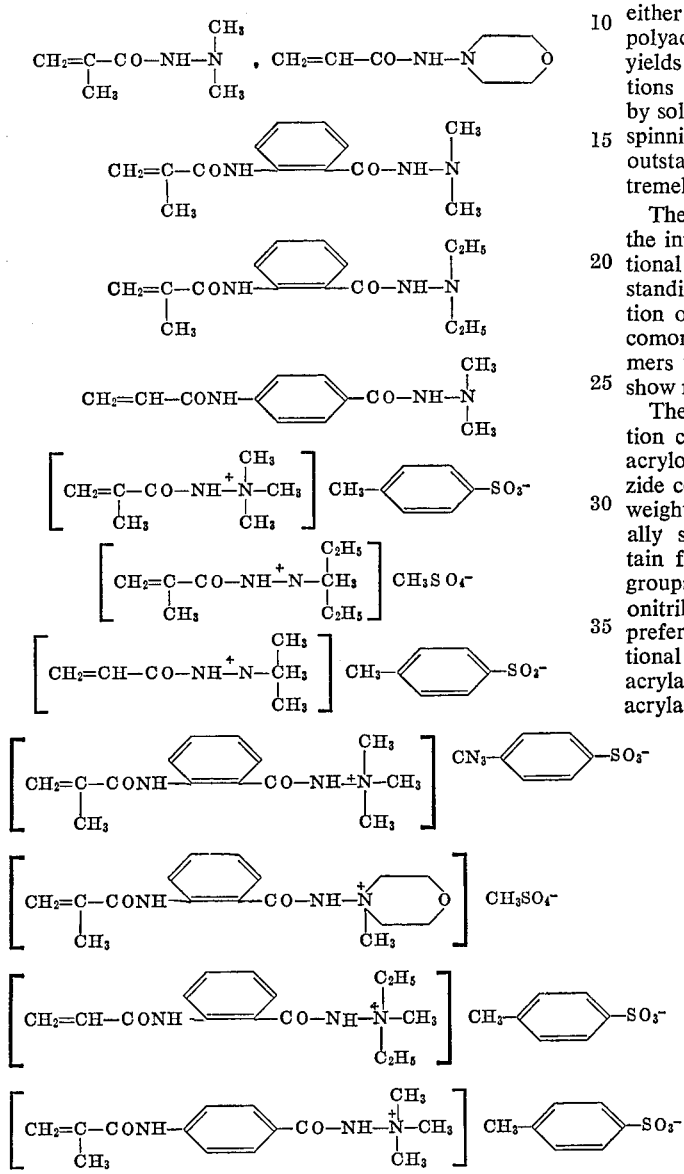

These comonomers may be prepared, according to one of the applicants' earlier proposals, by reacting acrylic or methacrylic acid chloride or an aromatic nitrocarboxylic acid chloride with an N,N-disubstituted hydrazine, whilst the product of last-mentioned reaction may be reacted with acrylic or methacrylic acid chloride following catalytic reduction of the nitro group. The resulting unsaturated N,N-disubstituted carboxylic acid hydrazides may be quaternised with organic esters of inorganic or organic acids, for example dimethyl sulfate or methyl toluene sulfonate.

The comonomers are readily soluble both in water and in polar organic solvents, such as dimethyl formamide, dimethyl acetamide, dimethyl sulfoxide or ethylene glycol carbonate. Aqueous solutions of the non-quaternised products are weakly acidic and those of the quaternised derivatives are strongly acidic. It was, therefore, surprising that these comonomers, or the functional groups incorporated in them should impart to the polymer such a high affinity for acid dyes. The lack of basicity in the functional groups also accounts for the other advantageous properties, such as the outstanding polymerisability, the high degree of whiteness of the copolymers and their limited tendency towards discoloration. The comonomers used in the process according to the invention may readily be copolymerised with acrylonitrile, optionally in conjunction with one or more additional comonomers, either in aqueous medium or in organic solvents for polyacrylonitrile. High polymerisation velocities and good yields can be obtained in these processes. Spinning solutions prepared from the polymers or obtained directly by solution polymerisation can be converted by dry or wet spinning into white, thermally stable filaments and with outstanding textile properties even when having extremely low deniers.

The new comonomers used in the process according to the invention, which contain one particularly active functional group, have the effect that the copolymers are outstanding in all the properties so important in the production of acrylic fibers, combine the advantages of known comonomers that are suitable for the production of polymers with a high affinity for acid dyes and, in addition, show new advantageous properties.

The copolymers prepared in accordance with the invention comprise at least 80% by weight of copolymerised acrylonitrile. The N,N-disubstituted carboxylic acid hydrazide comonomer component may be from 0.5 to 20% by weight, although it is preferably from 5 to 12%. Generally speaking, it is desirable that the copolymer contain from 200 to 400 milliequivalents of dye-absorbing groups per kg. of polymer. The copolymerisation of acrylonitrile with the unsaturated carboxylic acid hydrazides is preferably carried out in the presence of one or more additional neutral comonomers, for example acrylates, methacrylates, vinyl esters, styrene and its neutral derivatives, acrylamides or methacrylamides. They may be present in the polymer in quantities from 2 to 12% by weight and preferably in quantities of from 5 to 8% by weight.

The percentages by weight are based on the total amount of monomers used.

In aqueous medium, polymerisation is carried out either continuously or batchwise at a pH-value below 7. The pH-value is conveniently adjusted by strong mineral acids, for example sulfuric acid or phosphoric acid, or by organic sulfonic acids, for example toluene sulfonic acid. The pH-value during polymerisation is preferably from 1.5 to 3. When the strongly acid quaternary salts are copolymerised, polymerisation may even be carried out in the absence of an acid. The quantity of water used is generally from 5 to 10 times the quantity of monomer used. The reaction temperature is generally from 30 to 70° C. and preferably from 40 to 55° C. Compounds that are able to form reactive radicals, for example azo compounds or organic or inorganic peroxidic compounds, may be used as catalysts for the polymerisation reaction. It is, however, preferred to use Redox systems, particularly those based on peroxidic compounds and compounds of sulfur in a low oxidation stage. The water-soluble salts of persulfuric acid, for example sodium, potassium or ammonium persulfate, are preferably used as peroxidic compounds in the Redox system, whilst sodium or potassium hydrogen sulfite or pyrosulfite are used as reduction component. The quantity in which the catalysts are used is preferably such that the polymer formed has a K-value of 75 to 90 (according to Fikentscher, Cellulosechemie, 13, page 58, 1932), and is generally from 0.5 to 3% by weight based on the total weight of the monomers used. Emulsifiers, wetting agents or special electrolytes may, if desired, be used in small quantities to regulate the grain size of the polymer formed and hence such properties as filterability and ease of drying. It is of advantage to flush the polymerisation vessels with nitrogen, for example, before the reaction begins, and to keep away atmospheric oxygen during the course of the reaction. The polymers prepared by the process according to the invention are precipitated from the reaction medium (even if grain regulators have not been added) in the form of fine, readily filterable particles. Fine, readily soluble powders are formed from them when drying is carried out in a stream of air heated at 150 to 180° C. Polymers of this type may readily be converted, in conventional solvents for polyacrylonitrile, for example dimethyl formamide, dimethyl acetamide, dimethyl sulfoxide or ethylene glycol carbonate, into highly concentrated, readily spinnable solutions.

Conventional solvents for polyacrylonitrile may also be used as reaction media for solution polymerisation. Of the known organic solvents, dimethyl formamide or dimethyl sulfoxide are preferably used. The initial concentration of the monomers in the reaction mixture is such that, on completion of polymerisation, clear haze-free solutions are formed which can still be delivered through pipes at temperatures from 35 to 40° C. In the process according to the invention, the total monomer concentration is conveniently from 20% to 40% by weight, depending upon the comonomer component and the type of solvent used. Radical-forming catalysts that are soluble in the solvents used, for example azoisobutyronitrile, ammonium persulfate, organic hydroperoxides, keto peroxides, acyl peroxides or peroxy esters, may be used to initiate polymerisation. It is preferred to use Redox systems comprising the aforementioned organic peroxides and reducing compounds, for example sulfinic acid derivatives, sulfinic acid amides in particular. The quantity in which the catalysts are used is generally from 0.5 to 3% by weight, depending on the other reaction conditions and on the required molecular weight. It is usually of advantage for the reaction mixture to contain a strong acid, such as sulfuric acid or an aromatic sulfonic acid, in a quantity from 0.05 to 1.0% by weight and/or water in a quantity from 0.5 to 2% by weight. The polymerisation temperature may be in a range from 0 to 80° C. depending upon the type of catalyst used, although polymerisation is preferably carried out at a temperature from 25 to 60° C. Polymerisation may be carried out either batchwise or continuously in conventional reaction vessels, preferably in the absence of air. After the required conversion and polymer concentration have been reached, the reaction is stopped. The highly viscous solutions formed are colourless or only slightly yellow in colour, clear and gel-free, with the result that no difficulties at all are involved in their further processing. They may be spun by conventional dry or wet spinning processes into fibres or filaments of any normal denier, either directly or following removal of any unreacted volatile monomers, for example in a falling film evaporator at reduced pressure.

The following example is to further illustrate the invention.

EXAMPLE

Polymerisation was carried out in aqueous medium in an enamelled 150-litre-capacity vessel which was equipped with stirring mechanism, reflux condenser, nitrogen inlet and thermometer, being connected to a water circuit for heating. Desalted water (88 litres) heated at 55° C. was initially introduced and the air subsequently displaced from the vessel with nitrogen. The following materials were then added in the order indicated: 6.58 kg. of acrylonitrile, 420 g. of methyl acrylate, 610 g. of the compound

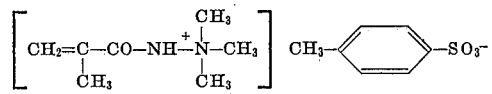

46 g. of potassium persulfate and 32 g. of sodium pyrosulfite (the last two components each being dissolved in 500 ml. of desalted water). Finally, the pH was adjusted to a value of 2 with 20% by weight toluene sulfonic acid solution. Polymerisation was carried out at 50° C. under a protective nitrogen pressure. After a reaction time of four hours, the resulting fine-grained pure white polymer was isolated by means of a filter centrifuge, washed free from acid with desalted water and dried in vacuo at 50 to 55° C. The copolymer obtained had a K-value of 82.9. It contained 238 milliequivalents of quaternised semicarbazide groups per kg. of polymer, and included 5.9% by weight of methyl acrylate. The yield amounted to 84%.

Preparation of the compound

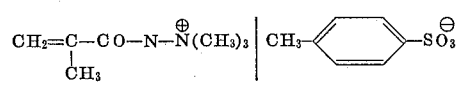

To a solution of 120 parts by weight of dimethylhydrazine and 1 part by weight of tert.-butylpyrocatechol in 1500 parts by volume of toluene are added 200 parts by weight aqueous $Na_2SO_4$-solution, and the mixture cooled to $-25°$ C. 208 parts by weight of methacroylic acid chloride and 375 parts by weight of a 40% aqueous KOH are added dropwise in equivalent amounts so that there is always present a small excess of alkali and only after the addition of the last drops of methacroylic acid chloride the solution becomes neutral. The mixture is stirred for another two hours at $-20°$ C., filtered, and the organic layer is separated from the aqueous layer. Having distilled off the toluene from the organic layer in a water-jet vacuum the methacroylic acid dimethylhydrazide is obtained in crystalline form. The yield after recrystallisation from gasoline after addition of petrol ether is 65%. Melting point 64–65° C.

128 parts by weight (1 mol) of methacryloyl-N,N-dimethylhydrazide are disolved in 500–1000 parts by weight of benzene and stabilized by addition of 0.5 part by weight of phenothiazine. 240 parts by weight (1.1 mol) of methyl-p-toluene-sulfonate are added dropwise and the solution is stirred for 12 hours. The quaternisation product

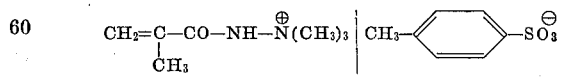

precipitates and can be isolated by filtration. Yield 250–260 parts by weight, melting point 182° C.

What we claim is:
1. A fibre-forming acrylonitrile copolymer containing at least 80% by weight of copolymerised acrylonitrile and 0.5 to 20% by weight of a copolymerised N,N-disubstituted carboxylic acid hydrazide of the formula

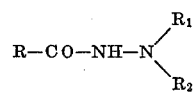

or its quaternised derivative of the formula

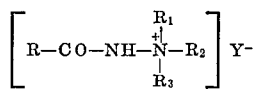

wherein $R_1$ and $R_2$ each represents an alkyl radical or $R_1$ and $R_2$ together with the nitrogen atom to which they are attached, form a heterocyclic ring, R represents a radical of the formulae

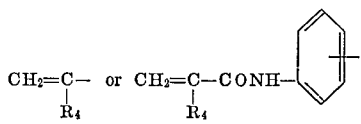

wherein $R_4$ represents hydrogen or a methyl radical, $R_3$ represents a $C_1$ to $C_5$-alkyl radical and $Y^-$ represents an anion selected from the group consisting of an organic sulfate and an organic sulfonate, the balance being 2 to 12% by weight of one or more additional comonomers.

2. A process for the production of acrylonitrile copolymers, which comprises copolymerising at least 80% by weight of acrylonitrile together with an olefinically unsaturated N,N-disubstituted carboxylic acid hydrazide or a quaternisation product thereof, the balance being 2 to 12% by weight of one or more additional comonomers, the percentages by weight being based on the total of monomers being used.

3. The process of claim 2, said copolymerising being carried out in aqueous medium in the presence of a Redox catalyst.

4. The process of claim 2, said polymerising being carried out in a solvent for polyacrylonitrile in the presence of a radical-forming catalyst.

5. The fiber-forming acrylonitrile copolymer of claim 1 wherein $Y^-$ is dimethyl sulfate or methyl toluene sulfonate.

References Cited
UNITED STATES PATENTS 3,412,077  11/1968  Szita _____ 260—79.3
3,414,569  12/1968  Wieden _____ 260—247.1

JOSEPH L. SCHOFER, Primary Examiner

C. A. HENDERSON, JR., Assistant Examiner

U.S. Cl. X.R.

260—85.5, 247.1, 501.13, 501.15, 551, 561